United States Patent [19]
Erb

[11] 3,840,037
[45] Oct. 8, 1974

[54] DIAPHRAGM SAFETY VALVE
[76] Inventor: Karl Friedrich Erb, Klugstr. 77, 8 Munich 19, Germany
[22] Filed: Nov. 26, 1971
[21] Appl. No.: 202,268

[30] Foreign Application Priority Data
Nov. 27, 1970 Germany.............................. 2058396

[52] U.S. Cl. ................................................. 137/70
[51] Int. Cl. ............................................ F16k 17/16
[58] Field of Search .................................. 220/89 A; 137/68–71

[56] References Cited
UNITED STATES PATENTS
2,932,308   4/1960   Erb ........................................ 137/70
FOREIGN PATENTS OR APPLICATIONS
532,401   8/1955   Italy ....................................... 137/71
1,500,018   4/1969   Germany ............................... 137/69

Primary Examiner—William R. Cline
Assistant Examiner—Richard Gerard
Attorney, Agent, or Firm—Connolly and Hutz

[57] ABSTRACT

The safety valve chamber holds an intermediate ring, providing the valve seat, and a pair of valve diaphragms which can be clamped on the outlet and inlet sides of the intermediate ring. One of these diaphragms may be omitted to condition the valve to relieve at a relatively lower pressure than with both of the diaphragms. The central portions of the diaphragms may be domed to receive a counter pressure support on the inlet side and these domes may be recessed within an indentation in the end of the closure member. An intermediate closure member may be inserted between the diaphragms and it may nest within a conically indented valve seat in the intermediate ring. A convexly arched closure support disc may be sprung within an undercut recess in a domed inlet diaphragm which nests within corresponding recesses and domes in the intermediate closure member and outlet diaphragm. Rupture grooves may be provided in the diaphragms aligned with guide and seat gaps in the valve. The intermediate ring may also be inwardly tapered to provide a valve seat which is conically indented toward the inlet port.

19 Claims, 4 Drawing Figures

DIAPHRAGM SAFETY VALVE

BACKGROUND OF THE INVENTION

Existing diaphragm safety valves have a narrow gap bridged by the diaphragm, either between closure member and valve seat as so-called seat gap, or between closure member and the guiding passage as so-called guide gap (cf. German Pat. No. 840,182, FIG. 6, No. 38 and FIG. 7, No. 46).

The bridged portion of the gap, and thus the limitation of the area upon which pressure is exerted and from which results the severing force upon the diaphragm, is, in the case of the seat gap, at the inner rim, in the case of the guide gap outside the outer rim of the valve seat. The magnitude of the area upon which pressure is exerted exceeds, in the case of the guide gap, the area in the case of the seat gap because of its greater diameter. The effective force for elevating the closure member and severing the diaphragm is accordingly larger. For this reason, at low pressures, the guide gap bridged by a diaphragm is indicated. In the case of a ruptured guide gap diaphragm after relieving of the valve, the rim of the severed inner round disc works as sealing ring between valve seat and closure member, thus improving tightness of the safety valve. In that case also the magnitude of the area upon which pressure is exerted is reduced to that of the adjacent seat gap, requiring an augmented pressure to elevate the closure member. For the seat gap however and its diaphragm, the magnitude of the area upon which pressure is exerted, is the same in unruptured and ruptured condition and at a definite pressure in both cases the same force is exerted upon the closure member.

The object of the invention is to provide a diaphragm safety valve which, in consideration of the special properties of the two kinds of gaps which may be bridged, is suitable for use at very different pressures and affords an increased tightness.

SUMMARY

The present invention is characterized in that the upper portion of the valve housing (outlet port) extends close to the closure member and forms therewith a narrow gap, i.e., a guide gap, which may be bridged by a valve diaphragm. Furthermore, an intermediate ring, providing the valve seat, projects under the closure member and forms therewith a second gap, i.e. a seat gap, which may be bridged by a second valve diaphragm. Finally, a diaphragm is clamped at least on one side of the intermediate ring and optionally on both sides to condition the valve to relieve at relatively higher pressures. When two diaphragms are used, this provides unchanged magnitude of the area upon which pressure is exerted, with help of the seat gap diaphragm. The guide gap diaphragm helps provide good tight sealing in the case of ruptured diaphragms. The simultaneous arrangement of both diaphragms in the valve chamber helps provide increased tight sealing over all.

A pressure relief valve with two diaphragms is already known (cf. German Pat. No. 951,406, FIG. 3) but the diaphragm (36) arranged towards the outlet spans a large distance where it is not supported against pressure. It is thus not a valve diaphragm. An intermediate ring, not providing a valve seat, separates the outer rim portions of the two diaphragms.

In the case of the diaphragm safety valve of the present invention only one valve diaphragm is installed and clamped at low and medium pressures and a sealing ring can be substituted for the diaphragm on the other side of the intermediate ring. At higher pressures, and in order to achieve a particularly good sealing, a diaphragm is installed and clamped on both sides of the intermediate ring. The lower diaphragm is severed upon pressure relief at the higher pressure without any substantial additional resistance being offered by the upper diaphragm, and they both are therefore broken essentially together.

This resistance can still be diminished by conically shaping the valve seat. Then the outlet valve diaphragm first largely yields when the closure member is lifted.

In many cases the lower portion of the valve housing has a support collar which supports the central portion of a diaphragm clamped between it and the intermediate ring.

In order to support the center portions of the diaphragms at possible counter-pressure in the valve, an auxiliary seat is arranged in the inlet port of the valve housing, on which a counter-pressure support for the diaphragms loosely rests at a small distance from the closure member.

The counter-pressure can also be counteracted by inserting a second closure member under the primary closure member and between the central surfaces of the two diaphragms. This second closure member may rest on the valve seat of the intermediate ring. The valve thus has an upper and a lower closure member.

In order to maintain a close connection of the central parts of the diaphragms with the closure member when they are severed upon response of the valve, the second closure member has a bottom recess, preferably having an undercut wall and an upwardly arched bottom — into which recess fits a protrusion or dome of the inlet diaphragm, which is pressed into the undercut recess upon exertion of pressure.

It is furthermore provided that a downwardly arched supporting disc with a downwardly directed stud, which preferably has a threaded hole, is pressed into the recess under the dome of the inlet diaphragm. Thereby the disc is sprung upwardly to reverse the arch and increase the outer diameter to retain the disc within the undercut recess in the diaphragm. The threaded stud serves to pull the disc out again.

For the operation of the valve it is advantageous that each of the utilized diaphragms have at least one rupture groove. These rupture grooves are advantageously aligned with the corresponding guide or seat gaps.

The drawings schematically show some embodiments of the invention, with only the center portion of the valve which is essential to the invention being illustrated. Some parts and distances adjacent and relating to the diaphragms, particularly the thicknesses thereof, have been shown in an enlarged scale.

DESCRIPTION OF THE PREFERRED EMBODIMENTS.

Figure 1:
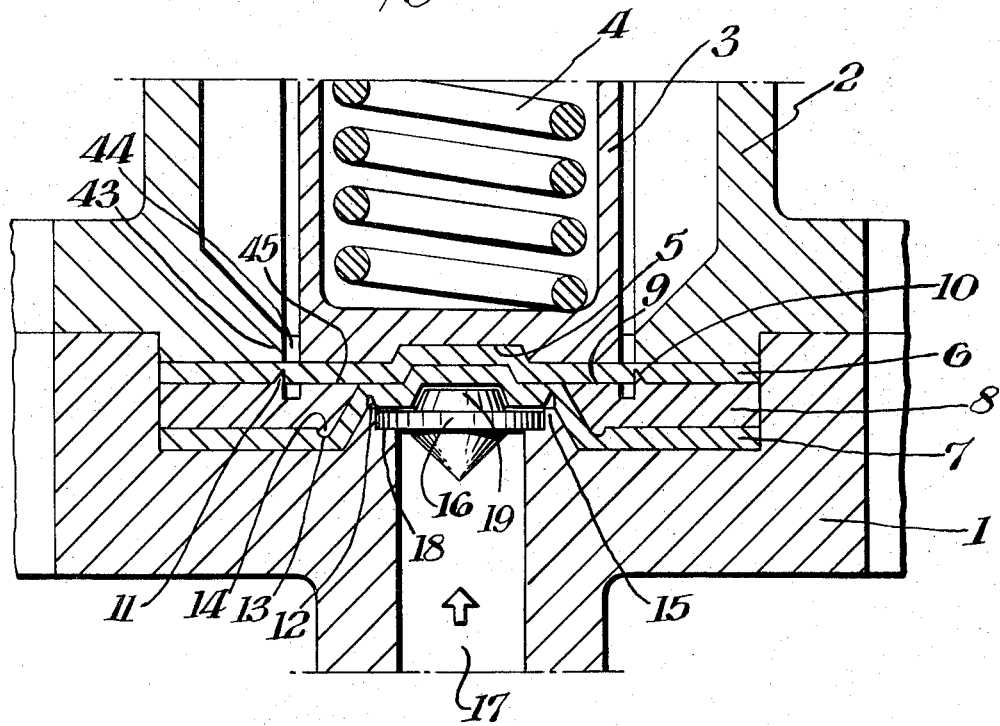
FIG. 1 shows a diaphragm safety valve of the invention with two valve diaphragms installed in the valve.

The embodiment of FIG. 1 comprises a lower valve housing member 1 and an upper valve housing member 2. The closure member 3 is biased by a spring 4 and is provided with a centrally indented receiver 5 in its lower end. The diaphragms 6 and 7 fit into this indented receiver 5. Diaphragms 6 and 7 have outer surfaces 36 and 38 clamped between housing portions 1 and 2 and inner surfaces 37 and 39 clamped against intermediate ring 8 disposed between them. Valve seat 9 is positioned on intermediate ring 8. The outlet port wall 43 forms with the closure member 3 the guide gap 44, the bridged end of which (bridged by upper diaphragm 6) is approximately aligned with the outer rim of valve seat 9. Diaphragm 6 has a rupture groove 10, which receives rib 11 of intermediate ring 8. Rupture groove 10 is in accordance with U.S. Pat. No. 3,623,495. The end of the seat gap 45 bridged by lower diaphragm 7 is positioned at the inner rim of valve seat 9. The size of the area upon which pressure is exerted in the bridged gap in the case of outlet diaphragm 6 thus exceeds the size of the corresponding area in the case of the diaphragm 7 because it has a larger effective diameter. Diaphragm 7 has a rupture groove 12 at the bridged gap 45 and a further interlocking groove 13, into which rib 14 of intermediate ring 8 is inserted. The lower portion 1 of the valve housing has a supporting collar 15 for the lower or inlet diaphragm. The lower and the upper diaphragms are accordingly supported by the counter pressure support 16, which is loosely positioned in inlet port 17 on an auxiliary seat 18 in collar 15 at a small distance from the closure member 3 and the diaphragms 6 and 7. The indented receiver 5 in the bottom of closure member 3 receives the projecting or domed part 19 of the counter-pressure support 16 and the domed parts of diaphragms 6 and 7 engaged over it.

The safety valve of this invention is shown in FIG. 1 with diaphragms 6 and 7 installed within the valve chamber between housing parts 1 and 2. It is thus conditioned for relieving at a relatively higher pressure and for achieving a particularly good sealing, also after relieving and rupturing of diaphragms. When the relatively higher pressure is exceeded, diaphragms 7 and 6 rupture substantially together at rupture grooves 12 and 10 along seat gap 45 and guide gap 44. The safety valve shown in FIG. 1 is conditioned for relieving at a relatively lower pressure by installing and clamping only outlet diaphragm 6 between outlet housing 2 and intermediate ring 8. Inlet diaphragm 7 is replaced by a simple sealing ring. In consequence of its greater area upon which pressure is exerted, diaphragm 6 will therefore rupture at a relatively lower pressure at rupture groove 10 along guide gap 44. If desired, a single diaphragm 7 may be installed with diaphragm 6 replaced by a simple sealing ring. This conditions the safety valve to be used at relatively high pressures.

Figure 2:
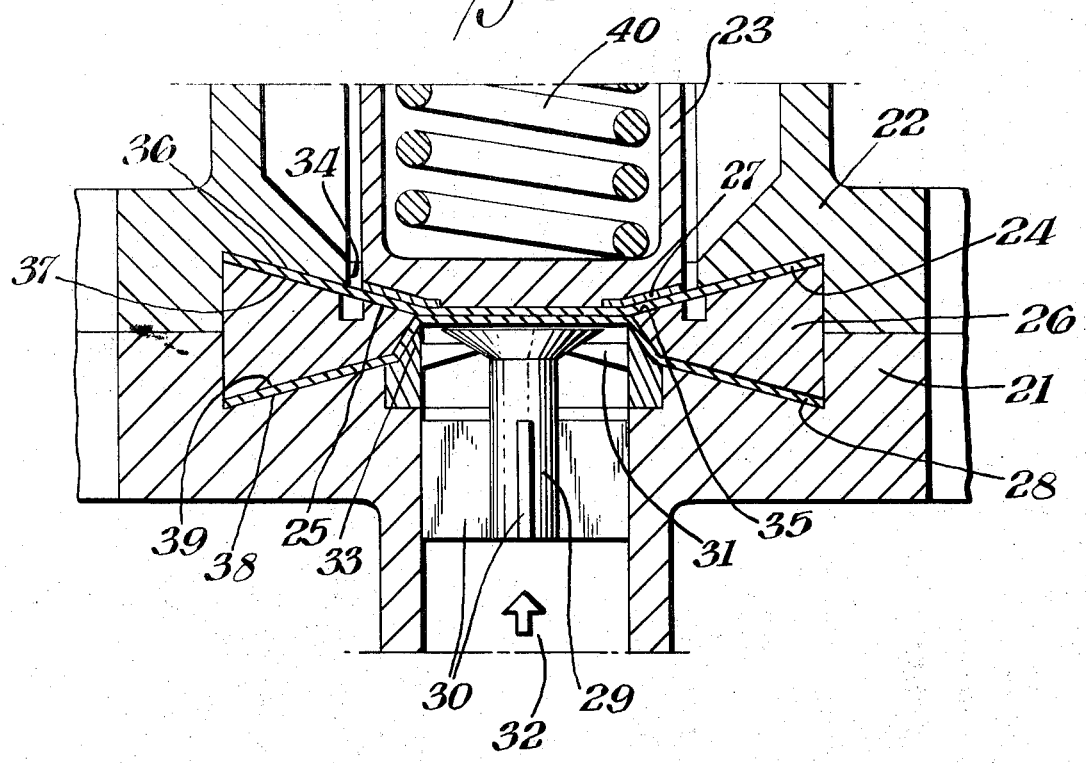
FIG. 2 shows a modified embodiment of the valve parts illustrated in FIG. 1.

FIG. 2 shows the lower valve housing member 21 and the upper valve housing member 22. The closure member 23 biased by spring 40 presses the upper or outlet diaphragm 24 on the conical valve seat 25 of intermediate ring 26. The closure member is coated with silver at point 27. Numeral 28 designates the lower diaphragm, and numeral 29 designates the counterpressure support, which is provided with the guide fins 30 riding against the walls of inlet port 32.

The supporting collar 33, for the conical wall of the diaphragm 28 is an insert within inlet port 32. It carries protrusions 31 serving as auxiliary seat for support 29. Diaphragm 24 bridges the guide gap 34, and diaphragm 28 bridges the seat gap 35 between valve seat 25 and closure member 23 covered by diaphragm 24.

The safety valve of the form of this invention shown in FIG. 2 is conditioned for relieving at different pressures in the same manner as described above relatively to the safety valve of FIG. 1, with either one or two diaphragms installed in it. Conical valve seat 25 helps to cause diaphragms 24 and 28 to rupture together when they are both installed.

Figure 3:
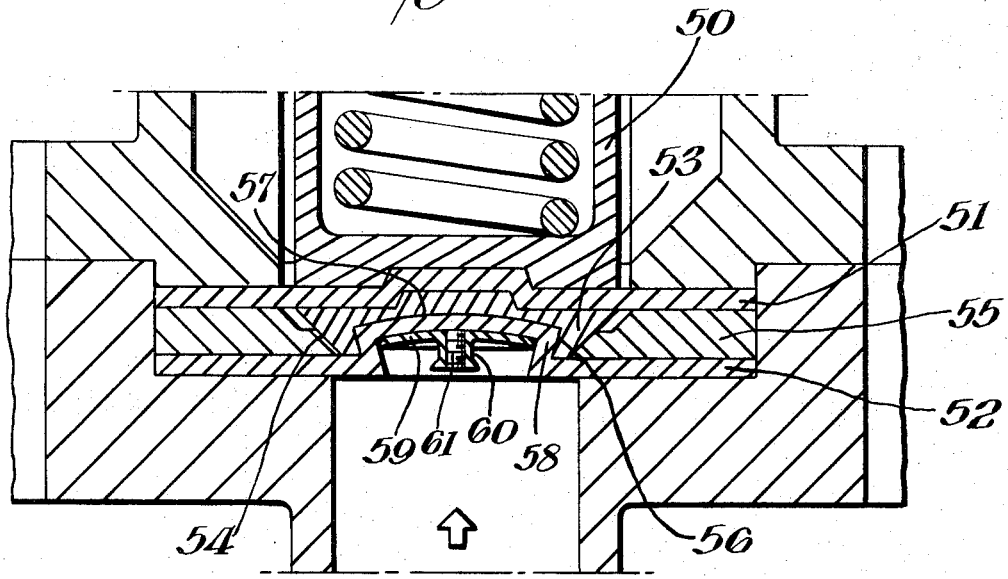
FIG. 3 is another embodiment of this invention with two closure members.

In FIG. 3 a second or auxiliary closure member 53 is arranged under the closure member 50 and between the diaphragms 51 and 52. It rests on the valve seat 54 of the intermediate ring 55 and has a recess with an undercut wall 56 and upwardly arched bottom 57. The protrusion or dome 58 of the diaphragm 52 fits into this recess. A supporting disc 59 is pressed into the recess under dome 58, which is correspondingly formed. Disc 59 is originally downwardly arched. It functions as counter-pressure support to hold the diaphragm 52 in position. For withdrawing supporting disc 59, it is provided with a central boss or stud 60 having a threaded hole 61, to permit drawing tools to grip or be secured to disc 59.

Figure 4:
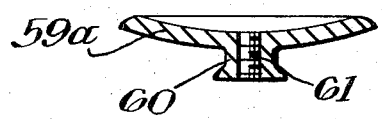
FIG. 4 shows a supporting disk for one of the diaphragms shown in FIG. 3.

FIG. 4 shows supporting disc 59a in cross-section in an enlarged scale and in its original condition (59a) i.e., downwardly arched before installation: It also shows a threaded hole 61 in boss or stud 60. Aluminum is, for example, a suitable material for the supporting disc 59, and it facilitates the reverse springing of disc 59a into its installed condition 59 shown in FIG. 3.

The form of safety valve of this invention shown in FIGS. 3 and 4 is conditioned for relieving at different pressures in the same manner as described for FIGS. 1 and 2 with either one or both diaphragms installed. The sprung reverse insertion of support disc 59 within the undercut recess under the dome 58 of inlet diaphragm 52 eliminates the need for a support collar in the inlet port and secures the diaphragms 51 and 52 and auxiliary closure member 52 for movement together upon actuation of the safety valve shown in FIG. 3.

I claim:

1. A diaphragm safety valve comprising a housing, an inlet port at one end of said housing and an outlet port at the other end of said housing, a valve chamber in said housing between and connecting said inlet and outlet ports, a closure member movably mounted in said outlet port, an intermediate ring in said valve chamber, said valve chamber having sufficient depth to receive diaphragms sealingly clamped on both sides of said intermediate ring wherein a valve seat for said closure member is disposed upon the surface of said intermediate ring adjacent said outlet port, said valve seat and said closure member forming a seat gap adapted to be overbridged by a first frangible valve diaphragm being disposed adjacent said inlet port with the downstream surface substantially supported by the closure member and intermediate ring, said housing having a portion disposed adjacent said outlet port extending to said closure member to define a guide gap with it which is adapted to be overbridged by a second frangible valve diaphragm with the downstream surface substantially supported by the closure member and adjacent housing clamping portion, at least one of said two valve diaphragms being disposed within and clamped in said valve chamber, and any omitted valve diaphragm being replaced by a sealing ring disposed between said housing and said intermediate ring.

2. A safety valve as set forth in claim 1 wherein two of said diaphragms are installed in said valve chamber.

3. A safety valve as set forth in claim 1 wherein said valve seat is conically indented toward said inlet port.

4. A safety valve as set forth in claim 1 wherein protrusions are disposed within said inlet port adjacent said valve chamber, and a counter pressure support is loosely mounted on said protrusions adjacent said valve chamber for supporting the central portions of said diaphragms.

5. A safety valve as set forth in claim 1 whereby the central portions of said diaphragms include domed sections for receiving a counter pressure support.

6. A safety valve as set forth in claim 5 wherein the end of said closure member disposed adjacent said valve chamber includes an indented receiver for receiving said domed portions of said diaphragms.

7. A safety valve as set forth in claim 1 wherein both of said valve diaphragms are disposed within and clamped in said valve chamber, and auxiliary closure member is disposed between said diaphragms, and said auxiliary closure member engages said valve seat on said intermediate ring.

8. A safety valve as set forth in claim 7 wherein said valve seat is conically indented toward said inlet port, and said auxiliary closure member engages within said conically indented seat.

9. A safety valve as set forth in claim 8 wherein said auxiliary closure member includes an indented receiver in its end disposed toward said valve chamber, one of said valve diaphragms being installed between said intermediate ring and said inlet port, and said one of said valve diaphragms having a dome engaging within said receiver in said auxiliary closure member.

10. A safety valve as set forth in claim 9 wherein the indented receiver is an undercut recess provided in said auxiliary closure member within which said dome of said valve diaphragm is received.

11. A safety valve as set forth in claim 10 wherein said diaphragm adjacent said outlet port and said auxiliary closure member also have central domes nested within each other and within said receiver.

12. A safety valve as set forth in claim 9 wherein said indented receiver in said auxiliary closure member having an undercut recess, and a counter pressure support disc being disposed within said undercut recess.

13. A safety valve as set forth in claim 12 wherein said counter pressure support disc has a central boss extending toward said inlet port.

14. A safety valve as set forth in claim 13 wherein said counter pressure support disc is convexly sprung into said recess in said diaphragm.

15. A safety valve as set forth in claim 14 wherein said central boss includes a securing means to facilitate its insertion and withdrawal.

16. A safety valve as set forth in claim 15 wherein said securing means is comprised of internal screw threads.

17. A safety valve as set forth in claim 1 wherein a rupture groove is provided in said diaphragms.

18. A safety valve as set forth in claim 17, wherein said rupture groove disposed in said second frangible valve diaphragm is aligned with said guide gap.

19. A safety valve as set forth in claim 18 wherein another diaphragm is installed within said valve chamber between said intermediate ring and said inlet port and another rupture groove in said other diaphragm approximately aligned with said seat gap is provided.

* * * * *